United States Patent
Nagler et al.

(10) Patent No.: US 6,298,969 B1
(45) Date of Patent: Oct. 9, 2001

(54) ACTUATION DEVICE

(75) Inventors: Franz Nagler, Gädheim; Thomas Otto, Gochsheim, both of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/442,301

(22) Filed: Nov. 19, 1999

(30) Foreign Application Priority Data

Nov. 19, 1998 (DE) .............................................. 198 53 405

(51) Int. Cl.[7] ...................................................... F16D 25/08
(52) U.S. Cl. ................................... 192/85 CA; 192/91 A
(58) Field of Search ............................ 192/85 C, 85 CA, 192/91 R, 91 A, 30 W

(56) References Cited

U.S. PATENT DOCUMENTS

| | | | |
|---|---|---|---|
| 4,023,660 | * 5/1977 | Dickinson | 192/52.4 X |
| 4,796,739 | 1/1989 | Jonner et al. | |
| 4,809,508 | 3/1989 | Kervagoret | |
| 5,042,631 | * 8/1991 | Ellenberger et al. | 192/85 C |
| 5,636,652 | 6/1997 | Toschi et al. | |
| 5,678,671 | * 10/1997 | Leimbach et al. | 192/91 R X |
| 5,944,159 | * 8/1999 | Schneider et al. | 192/85 C |
| 5,954,176 | * 9/1999 | Ishihara et al. | 192/85 C X |
| 6,033,341 | * 3/2000 | Yamamoto et al. | 477/181 |
| 6,116,399 | * 9/2000 | Drexl et al. | 192/91 A |

FOREIGN PATENT DOCUMENTS

| | | | |
|---|---|---|---|
| 33 21 578 | 1/1992 | (DE) | B60K/23/02 |
| 197 47 925 | 5/1998 | (DE) | F16D/48/06 |
| 0 459 273 | * 12/1991 | (EP) | |
| 889598 | 7/1958 | (GB) | |
| 2 337 311 | 11/1999 | (GB) | F16D/48/02 |

* cited by examiner

*Primary Examiner*—Rodney H. Bonck
(74) *Attorney, Agent, or Firm*—Cohen, Pontani, Lieberman & Pavane

(57) ABSTRACT

An actuation device for a friction clutch arranged in the drive train of a motor vehicle includes an engagement/disengagement arrangement having a pressure fluid cylinder and a pressure fluid piston axially displaceably arranged therein. The engagement/disengagement arrangement is operatively connected to a pressure fluid source via a control valve which is actuatable as a function of a first control parameter representing a required value and a second control parameter representing an actual value of the axial position of the pressure fluid piston. The control valve being actuated by an electromagnetic positioning device.

17 Claims, 8 Drawing Sheets

ACTUATION DEVICE

BACKGROUND OF THE INVENTION

1. Field of the Invention

The invention relates to an actuation device for a friction clutch arranged in the drive train of a motor vehicle including an engagement/disengagement arrangement having a pressure fluid cylinder and a pressure fluid piston axially displaceable therein, the engagement/disengagement arrangement being effectively connected to a pressure fluid source via a control valve actuatable as a function of a first control parameter representing a required axial position and a second control parameter representing the actual axial position of the engagement/disengagement arrangement.

2. Description of the Related Art

A known actuation device is known, for example, from German reference DE 33 21 578 C2 which discloses a positioning arrangement comprising a vacuum servo-force amplifier. The vacuum servo-force amplifier is constructed as a vacuum braking force amplifier arranged outside of a housing bell and is integrally configured with a pneumatic power cylinder and a control valve. A piston is axially guidably arranged with an elastic diaphragm in the pneumatic power cylinder and separates the pneumatic power cylinder into two working chambers. A first working chamber is configured as vacuum chamber and connected to an induction line system of an internal combustion engine. The second working chamber is used as control chamber and is selectively connectable by the control valve either to the vacuum chamber, i.e., the first working chamber, or to the atmosphere via a pressure-balance opening. The vacuum servo-force amplifier is driven by a control rod which is axially displaceable by a motor-driven cam. The position of the control valve is switched by the axial displacement of the control rod. The piston follows the motion of the control rod with an amplified force. The motion of the piston acts directly on a hydraulic master cylinder which in turn acts on a slave cylinder which is arranged outside the housing bell and acts, in turn, on an engagement/disengagement fork associated with the engagement/disengagement bearing arrangement. The control valve has a valve body which interacts with a flexible valve seat. A connecting duct is provided in the valve seat and the connection between the control chamber and the ambient air takes place via this connecting duct, provided the valve body is not pressed against the elastic valve seat in order to close the connecting duct by means of the valve body. A further connecting duct connects the control chamber with the vacuum chamber.

In addition, another known actuation device has a pneumatic power cylinder comprising a pressure fluid power cylinder arrangement. This known actuation device is fastened on the outside of a housing bell as an integral unit which comprises a pneumatic power cylinder, a hydraulic slave cylinder and the control valve. The piston of the pneumatic power cylinder is installed on a rod element forming the piston of the hydraulic slave cylinder. The rod element is connected to a push-rod which extends inside the housing bell and acts on an engagement/disengagement bearing arrangement. A master cylinder which is actuatable by a clutch pedal and a control input for the control valve are connected to the slave hydraulic cylinder. The control valve controls the supply of compressed air to the pneumatic power cylinder and the release of air from the pneumatic power cylinder as a function of the hydraulic pressure present at the control input so that a specified hydraulic pressure, determined by a compression spring arrangement, is set at the control input. In this arrangement, the slave hydraulic cylinder is used as a measurement cylinder which records the position of the rod element. Since the rod element is also connected to the push-rod which extends inside the housing bell and acts on an engagement/disengagement fork, the slave hydraulic cylinder indirectly records the position of the engagement/disengagement bearing arrangement. When the master cylinder is actuated, forces are exerted directly on the rod element, and therefore on the engagement/disengagement bearing arrangement, via the hydraulic slave cylinder used as the measurement cylinder. These forces are additional to the actuation forces of the pneumatic power cylinder due to the supply of compressed air to the latter.

It has been deemed advantageous to arrange the pressure fluid power cylinder of these known actuation devices within the housing bell. However, it is to be expected that the compact construction and known hydraulic control of these actuation devices will involve relatively high manufacturing costs with respect to the sealing requirements. Because, on the other hand, the engagement/disengagement function is to be achieved by means of an intrinsic engagement/disengagement arrangement so that the control line will not have to transmit any high forces, an economic and reliable alternative is desirable.

SUMMARY OF THE INVENTION

It is an object of the present invention to provide an actuation device of the type previously mentioned which is simple and functionally reliable and which does not comprise an external hydraulic control line.

To achieve this object, the actuation device for a friction clutch arranged in the drive train of a motor vehicle according to the present invention comprises an engagement/disengagement arrangement with a pressure fluid cylinder and a pressure fluid piston axially displaceable within it. The arrangement is operatively connectable to a pressure fluid source via a control valve that is actuatable as a function of a first control parameter representing a required position value and a second control parameter representing the actual axial position. Furthermore, the control valve is actuatable by an electromagnetic positioning device. According to the above-described embodiment of the present invention, hydraulic lines are not required between the clutch pedal and the control device. Rather, conventional cables, which are cheaper—and, in addition, simpler to lay and maintain—may be used. Furthermore, the conventional cables are less sensitive to aging and mechanical effects. Instead of direct actuation by the driver via the clutch pedal, a completely automatic solution can be readily effected by providing an appropriate control unit instead of the clutch pedal. A further advantage of the design is the complete decoupling of the engagement/disengagement device from the clutch pedal. Oscillating conditions occurring in the control circuit are accepted not by the pedal but by the electromagnetic positioning device and may be hydraulically or electrically damped in the control circuit.

The actuation device according to the invention is preferably arranged within a fixed, stationary clutch housing such, for example, as a clutch bell. The friction clutch may therefore be constructed in a very compact manner and additionally protect the actuation device from mechanical damage and dirt. In an optional embodiment, an arrangement that facilitates maintenance is ensured by a plug-in connection between the engagement/disengagement arrangement, which is coaxial with the gearbox shaft, and the positioning device and the control valve.

In a preferred embodiment, the engagement/ disengagement arrangement acts on the friction clutch via an axially displaceable engagement/disengagement bearing element for engaging and disengaging the clutch. An arrangement is then particularly preferred in which the engagement/disengagement arrangement and the engagement/disengagement bearing element are arranged on the same center line as the friction clutch.

A rotating or linearly effective electric motor is preferably employed as the electromagnetic positioning device. When an electric motor that generates a rotational motion is used, axial positioning may be effected by a threaded spindle and a spindle acceptance device. However, other gear stages which convert a rotational motion into an axial motion may also be employed equally satisfactorily. For example, the same results may be achieved, for example, by a rack or by an eccentric cam with rocker arm.

Step motors may also be used as the electromagnetic positioning device to select the desired position. General purpose electric motors may also, however, be employed equally satisfactorily with the positional information extracted from the electric current characteristic.

In an alternative embodiment, the electromagnetic positioning device actuates the control valve via a fluid. The hydraulic transmission allows for a choice of any given transmission paths and the actuation device can be very precisely matched to the installation space. In particular, this embodiment allows for actuation by a displacer which protrudes into a hydraulic space effectively connected to the control valve. For example, the displacer may be axially moved by via a connection to a linear motor or by a threaded spindle to displace a specified fluid quantity in the hydraulic space so that the increasing pressure actuates the control valve. In addition, a displacement sensing device may be arranged with the pressure fluid piston so that it moves axially with the pressure fluid piston and protrudes into the hydraulic pressure space. Therefore, movement of the pressure fluid piston changes the volume of the hydraulic space via the displacement sensing device as a function of the position of the pressure fluid piston. Accordingly, the control valve is actuated as a function of the positions of both the displacer and the displacement sensing device. In consequence, the control valve may be actuated so that any given position of the pressure fluid piston may be maintained.

To avoid fluid losses from the hydraulic system, sealing devices may be provided. Sealing devices pointing toward the hydraulic space are preferably fastened to the displacement sensing device and the seals pointing away from the hydraulic space are preferably fastened to the housing. The advantage of this arrangement is that the corresponding recesses in the housing are easily applied at the position pointing toward the outside.

In addition, the above objects may be achieved if a signal processing device (with an amplification device) which compares the actual value of the position of the actuator and the required value of the position of the actuator is furthermore used for controlling the electromagnetic positioning device. In this embodiment, the entire control process operates without a hydraulic device, thus substantially simplifying the construction of the actuation device. This lowers the manufacturing costs and reduces the maintenance and repair outlay. The recording of the actual value of the position of the actuator is preferable effected by an electrical displacement-sensing device. This sensing device is directly actuated by the position of the pressure fluid piston.

Furthermore, interpretations of the amount of pedal displacement may be selected substantially independently of mechanical and hydraulic considerations of the clutch itself. A preferred characteristic of pedal movement versus clutch bearing movement, for example, exhibits comparatively short displacements of the clutch pedal in the region of complete engagement or complete disengagement of the clutch. In consequence, long actuation paths may be required in the metering region, i.e., the region between the fully engaged and fully disengaged regions. This characteristic allows for precise operation of the slip of the clutch such, for example, as during a starting procedure, thereby substantially reducing the likelihood of abrupt engagement. Since only very small forces are necessary on the clutch pedal for driving the signal generator for the required value of the actuator position, any given pedal force characteristics may, for example, be generated by springs arranged on the clutch pedal.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
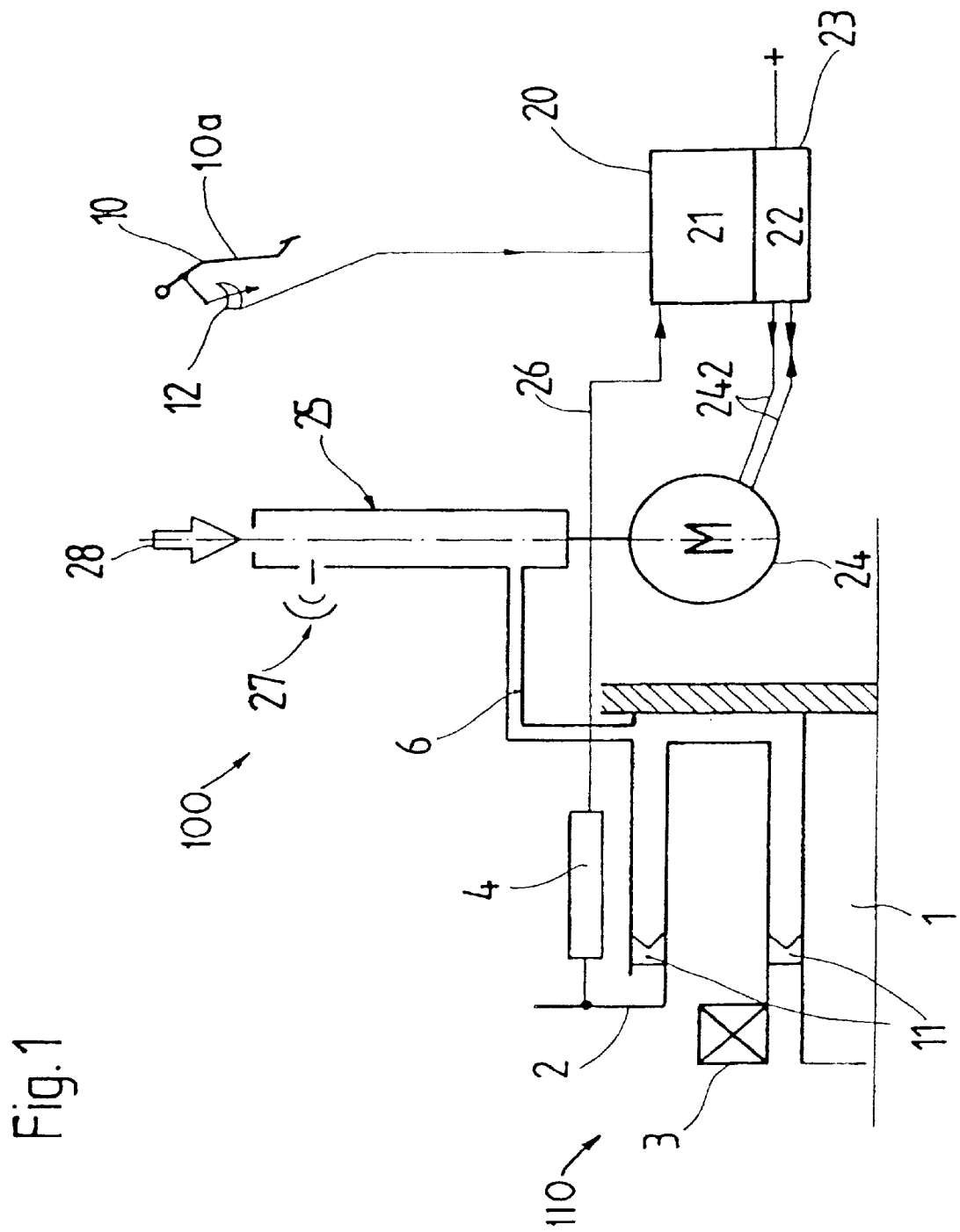
FIG. 1 shows a schematic circuit diagram of a control circuit for the actuation device according to an embodiment of the present invention.

FIG. 1 is a schematic diagram of an actuation device 100 according to an embodiment of the present invention having a pressure fluid cylinder 1 and an axially movable annular pressure fluid piston 2 inserted therein. The annular pressure fluid piston 2 is operatively connected for axially displacing an engagement/disengagement bearing 3 axially by thrust and/or traction. The pressure fluid cylinder 1, pressure fluid piston 2, and engagement/disengagement bearing 3 comprise an engagement/disengagement arrangement 110. Sealing devices 11 are arranged between the pressure fluid cylinder 1 and the pressure fluid piston 2. An electromagnetic positioning device 24 in this embodiment comprises an electric motor. A control valve device 25 driven by the electromagnetic positioning device 24 is connected via pressure fluid lines 6 to the inside of the pressure fluid cylinder 1 so that a volume enclosed by the pressure fluid piston 2 in the pressure fluid cylinder 1 may be modified by the control valve device 25. A pressure fluid source 28 supplies fluid to the control valve device 25 which has, in addition, a relief device 27.

A signal processing device 21 is arranged with a control and amplification device 22 for controlling the actuation device 100. The signal processing device 21 is connected via signal supply lines 26 to a required-value signal generator 10 and an actual-value signal generator 4, which records the position of the piston 2. In the embodiment of FIG. 1, the required-value signal generator 10 comprises a clutch pedal 10a actuating a potentiometer 12. The control and amplification device 22 is connected to the electromagnetic positioning device 24 via control lines 242. Instead of a motor, the electromagnetic positioning device 24 may comprise any device which converts electrical current into motion.

During operation, the control valve device 25 is adjusted as a function of the position of the electromagnetic positioning device 24 so that pressure fluid is supplied to the cylinder 1 via the pressure fluid source 8, pressure fluid supplied to the cylinder 1 is relieved via the relief opening 27, or the volume enclosed by the pressure fluid piston 2 in the pressure fluid cylinder 1 is maintained. Accordingly, the engagement/disengagement arrangement 110 may force the engagement/disengagement bearing 3 away from the pressure fluid cylinder 1, maintain a position of the engagement/disengagement bearing 3 in a condition without force, thereby allowing the engagement/disengagement bearing 3 to be moved back, for example, by spring force, or maintain any given position by an equilibrium of forces being generated, for example, by the above-mentioned spring force. This spring force is preferably generated by a pressure spring device of the clutch such, for example, as a plate spring which acts on the pressure fluid piston 2 via the engagement/disengagement bearing 3.

Figure 3:
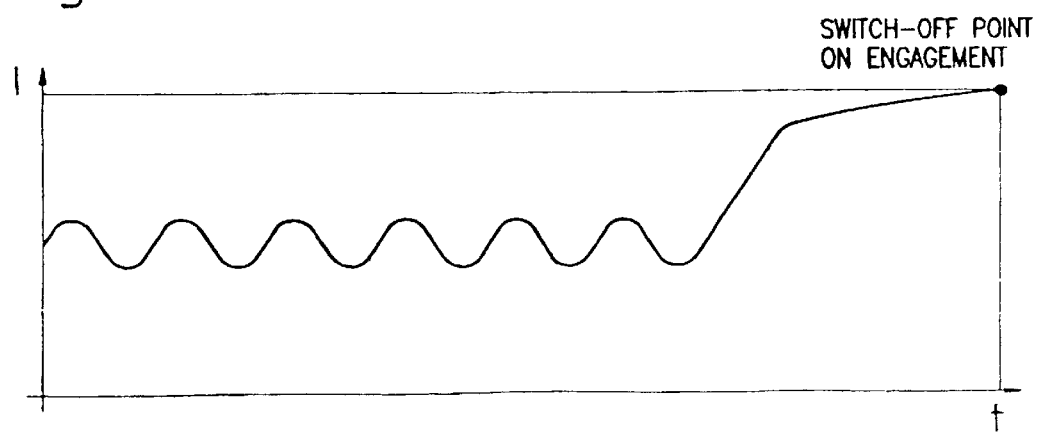
FIG. 3 is a graph showing current applied to the electromagnetic control device over time.

The position of the electromagnetic positioning device 24 is controlled as a function of required-value signals and actual-value signals. For this purpose, a voltage controlled by the potentiometer 12 is interpreted as a required-value signal by the signal processing device 21 and is compared with the actual-value signal which is directly related to the piston position supplied by the actual-value signal generator 4. Until the actual-value parameter reaches the required-value signal, a voltage is applied to the electromagnetic positioning device 24 via the control and amplification device 22, which moves the control valve device 25 to the desired position. The actual-value signal generator 4 preferably comprises an electrical displacement sensing device including a coil connected to the housing and a permanent magnet which is moved with the piston. This electrical displacement sensing device therefore determines the current position of the piston by the deformation of the common magnetic field. Alternatively, any other electrical actual-value displacement sensing device could be equally satisfactorily employed for this purpose—such as a potentiometer circuit. When the electromagnetic positioning device 24 comprises an electric motor, the control and amplification device 22 is provided with the pulses of current shown in FIG. 3, wherein each of the periodic pulses corresponds to a particular position of the motor and a constant high current corresponds to the stop location. During operation, the control device 22 obtains periodic information on the current position of the electromagnetic positioning device 24 and, in consequence, on the setting of the control valve 25, so that a position of the engagement/disengagement arrangement 110 and the engagement/disengagement bearing 3 corresponding to the required-value signal may be achieved.

Instead of a general purpose electric motor for the registration of the current pulses, the electromagnetic positioning device 24 may comprise a step motor whose control signal already contains the information on its required position.

Figure 2:
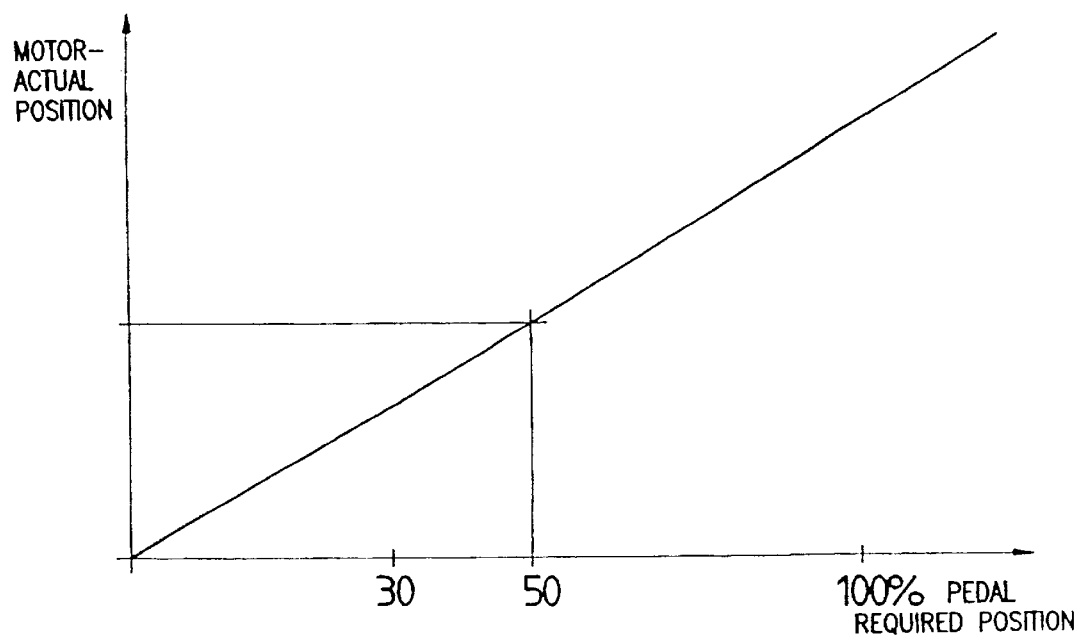
FIG. 2 is a graph showing a linear actuation control arrangement of the pedal force and the actuator position.
Figure 4:
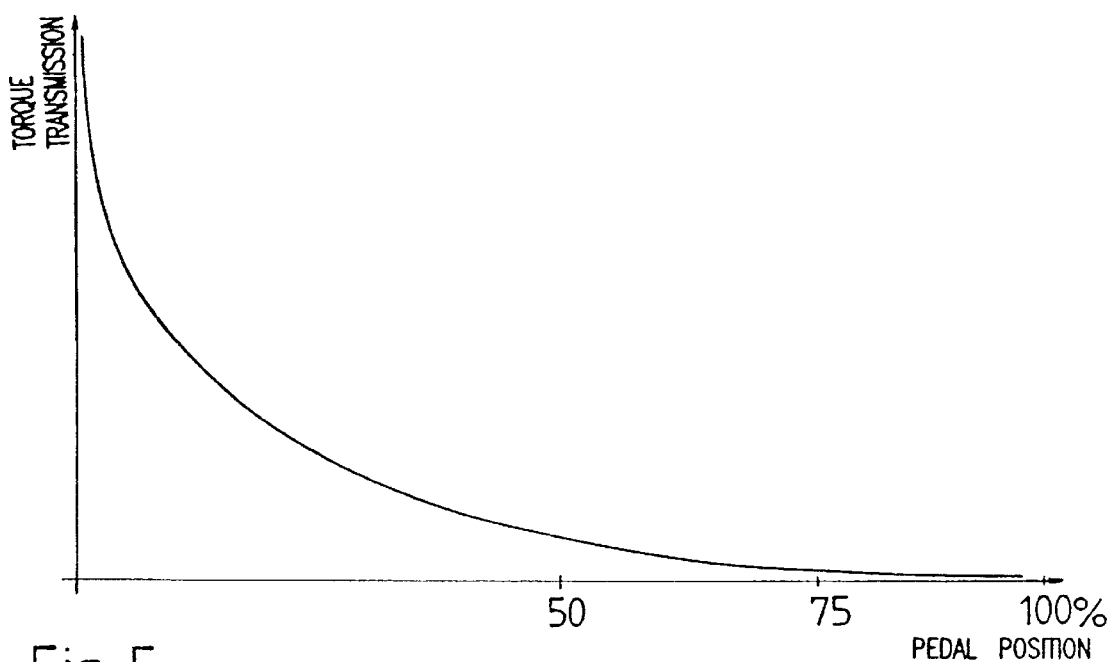
FIG. 4 is a graph showing a torque transmission characteristic for a friction clutch according to an embodiment of the invention.
Figure 5:
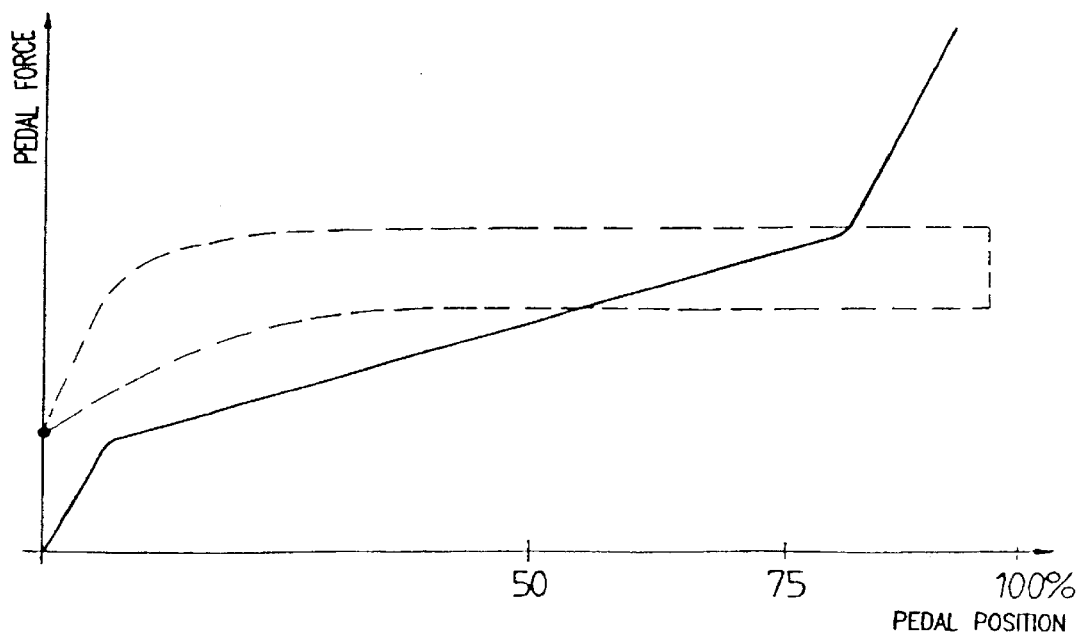
FIG. 5 is a graph showing a non-linear relationship between pedal force and actual position of the clutch actuator.

A linear dependence between the force of pedal 10a and the displacement of the engagement/disengagement bearing is shown in FIG. 2. However, any other given transmission relationship could also be generated. A preferred characteristic is shown, for example, in FIG. 5 in which the slopes at the ends of the movement of pedal 10a are noticeably steeper than the slopes of movement in the central region of the movement. This characteristic is preferred because the clutch does not have to be exactly controlled when the clutch is completely engaged or disengaged whereas, in the intermediate position the exact control of the desired slip of the clutch ensures a smooth pull-away. FIG. 4 shows an example of torque transmission as a function of pedal position.

Because the actuation of the clutch pedal 10a requires a very small force to produce the required-value signal, any given actuation characteristics can be generated by different spring elements. Instead of direct actuation by the driver via the clutch pedal 10a, a completely automatic actuation may be effected by an appropriate control unit 23.

Figure 6:
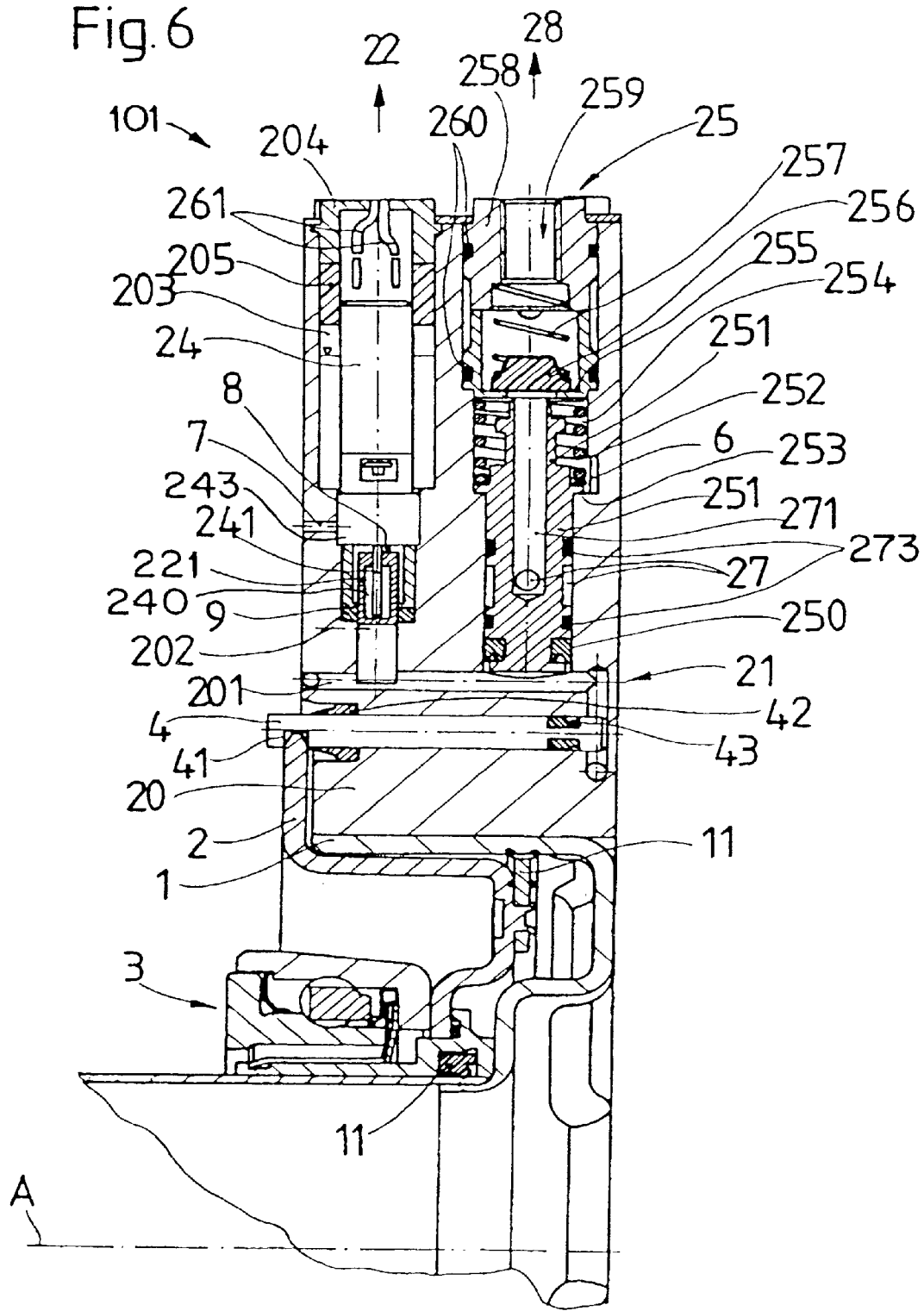
FIG. 6 is a longitudinal sectional view showing an actuation device according to another embodiment of the present invention with hydromechanical actual-value transmission.
Figure 7:
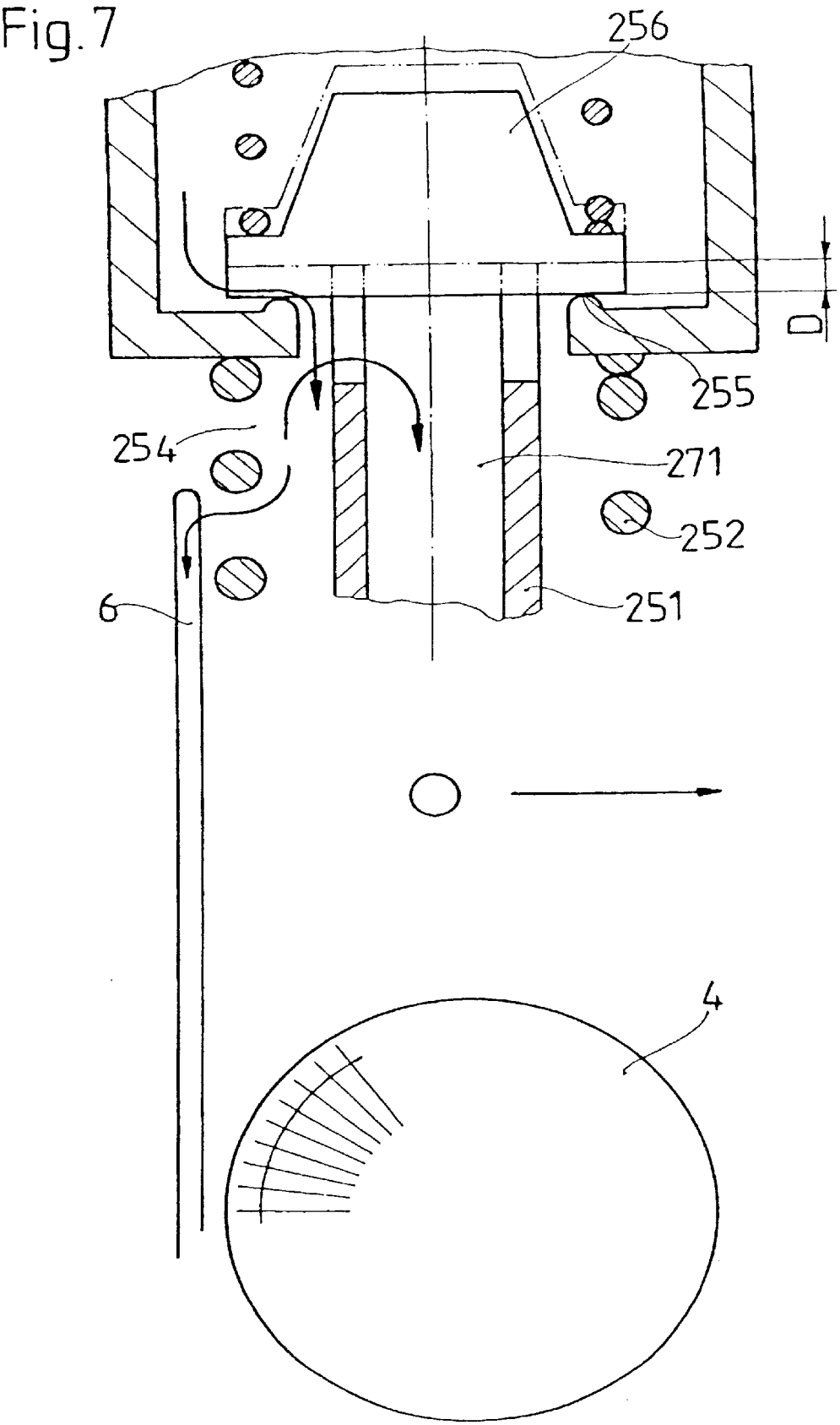
FIG. 7 is an enlarged sectional view through the control valve device of FIG. 6.

A further preferred embodiment is shown in FIGS. 6 and 7. FIG. 6 shows an actuation device 101 with a pressure fluid cylinder 1 and an axially movable annular pressure fluid piston 2 inserted therein to which an engagement/disengagement bearing 3 is fastened so that it can be axially displaced by thrust and traction. Annular sealing elements 11 fitted at the radial inner side and radial outer side of the pressure fluid piston 2. The pressure fluid cylinder 1 is fastened within a concentric circular opening in a housing 20.

An electromagnetic positioning device 24 is here configured as a rotating electric motor that drives, via a gear 243, a threaded spindle 241. A displacer 221 is connected to the spindle 241 via a spindle acceptance device 240. The motor is torsionally fastened in the housing 20 by a torque support 7 and the displacer 221 is fastened in the housing via an axial guide 9 so that the displacer is torsionally fixed but axially displaceable.

A lower end of the displacer 221 protrudes into a hydraulic pressure space 201 configured in the housing 20 and is operatively connected via the hydraulic pressure space 201 to a control valve 25. The displacer 221 frees, in its rest position on the motor-end stop, a snifter hole 202 to the balance container 203 which, as shown, preferably surrounds the motor and is sealed radially toward the outside by means of a cap 204 with a sealing ring 205. This preferred arrangement of the balance container 203 produces heating of the hydraulic fluid during operation. Due to the corresponding effect on the viscosity, mineral oils may also be employed here.

An actual-value signal generator 4 is axially movably supported in the housing 20 and includes a recess 41 which engages the pressure fluid piston 2 so that the actual-value signal generator 4 always moves with the pressure fluid piston 2. An end of the actual-value signal generator 4 opposite to the recess 41 protrudes into the hydraulic space 201 and there displaces a certain volume as a function of the position of the pressure fluid piston 2. During this procedure, seals 42 and 43 arranged on the actual-value signal generator 4 prevent the escape of any hydraulic fluid.

As shown in FIG. 6, the longitudinal center line of the control valve device 25 is parallel to that of the electromagnetic positioning device 24 and the control valve device 25 is approximately the same distance as the electromagnetic positioning device 24 from the rotational center line A of the clutch. The control valve device 25 comprises an axially movable valve plunger 251 which protrudes into the hydraulic space 201 and is pressed by a helical spring 252 in the direction toward the hydraulic space 201 against a stop 253. Sealing elements 250 are arranged at the lower end of the valve plunger 251 for sealing the valve plunger 251 relative to the hydraulic space 201. The valve plunger 251 also includes a relief opening 27 associated with a longitudinal hole 271. The valve plunger 251 further comprises seals 273 arranged about the relief openings 27 so that the relief openings 27 are sealed relative to the hydraulic pressure space 201 and a pneumatic pressure space 254 arranged at the upper end of the valve plunger 251. A valve seat 255 is attached to the housing 20 in the region of the radial outer end of the valve plunger 251 above the pneumatic pressure space 254. An axially movable valve head 256 is pressed by a spring element 257 against the valve seat 255 and provides gas-tight closure of the valve seat 255 in the rest position of the valve plunger. The other end of the spring element 257 is supported on a plug cap 258 which additionally contains the pressure fluid connection 259. The radial outer circumference of the plug cap 258 is closed by seals 260.

During operation, the volume in the hydraulic pressure space 201 is substantially constant. If the clutch pedal is actuated starting from the rest position, for example, the control device 22 applies a voltage to the electromagnetic positioning device 24 until the position or rotational speed of the electromagnetic positioning device 24 positions the engagement/disengagement bearing until the actual-value signal reaches the required-value signal generated by the pedal position. The rotation of the threaded spindle 241 in the spindle acceptance device 240 produces a movement of the displacer 221 by a distance corresponding to the pedal position and, in the process, displaces a corresponding volume in the hydraulic pressure space 201. Because of the very much higher reaction force, particularly in the installed condition, the actual-value signal generator 4 initially remains in its position and the pressure in the hydraulic pressure space 201, which rises in consequence, moves the valve plunger 251 onto the valve head 256.

As may be seen from FIGS. 6 and 7, there is initially a clearance D between the valve plunger 251 and the valve head 256 so that as the valve plunger 251 is moved within the clearance D, the relief hole 271 is free. Until this clearance is taken up, pressure can not be transmitted from the pneumatic cylinder because the pressure has an escape through the relief hole 271. It is only when the clearance D has been taken up, therefore, that pressure can be transmitted from the pneumatic pressure space 254 via the pressure line 6 into the pressure fluid cylinder 1. When this occurs, the pressure fluid piston 2 moves together with the engagement/disengagement bearing 3 toward the open end of the cylinder 1 with the actual-value signal generator 4 being taken along with the piston 2. This moves the actual-value signal generator 4 out of the hydraulic pressure space 201 and therefore decreases the pressure in the hydraulic pressure space 201. Accordingly, the force on the valve plunger 251 falls and the helical spring 252 urges the valve plunger 251 to move away from the valve head 256 until the valve head 256 is again located on the valve seat 255. Because the valve plunger 251 is above the clearance D and the relief hole 271 is initially still closed, the pressure in the pressure line 6 and in the pressure fluid cylinder 1, and therefore also the position of the pressure fluid piston 2 and the engagement/disengagement bearing 3, are kept constant. If, as a consequence of a corresponding signal, the displacer 221 is now moved further into the hydraulic space by the positioning device 24, the procedure can be repeated until the displacer 221 reaches its maximum stop. If, on the other hand, the displacer 221 is pushed out of the hydraulic space 201, the pressure on the valve plunger 251 falls. In this configuration, the plunger 251 is moved further from the valve head 256 and frees the relief hole 271. The pressure in the pressure fluid cylinder 1 then escapes via the pressure line 6 through the relief hole 271 and the relief opening 27.

Accordingly, there are three operatively relevant positions of the control valve device 25. In a rest position, the valve head 256 closes the valve seat 255 and the relief hole 271 is open. In this position, atmospheric pressure is present in the pressure fluid cylinder 1 in the equilibrium condition and the clutch is engaged. In an actuation position, the plunger 251 is pushed fully upward and the valve head 256 is lifted from the valve seat 255 and the relief hole 271 is closed. In this position, the pressure generated by the pressure fluid source 28 is present as a quasi-steady state in the pressure fluid cylinder 1 and the clutch is disengaged. In a middle position of the control valve device 25, the valve head 256 is located on the valve seat 255 and the relief hole 271 closed. In this position, the pressure in the pressure fluid cylinder 1 and the position of the engagement/disengagement bearing 3 are kept constant.

Therefore, in the embodiment of FIGS. 6 and 7, the control of the control valve device 25 is effected by pressure and volume in the hydraulic space 201. This additionally provides the possibility of fitting the control valve 25 and the electromagnetic positioning device 24 in parallel to one another and at right angles to the rotational center line A, as in FIG. 6, because the transmission of the positioning device to the control valve may likewise take place hydraulically.

Figure 8:
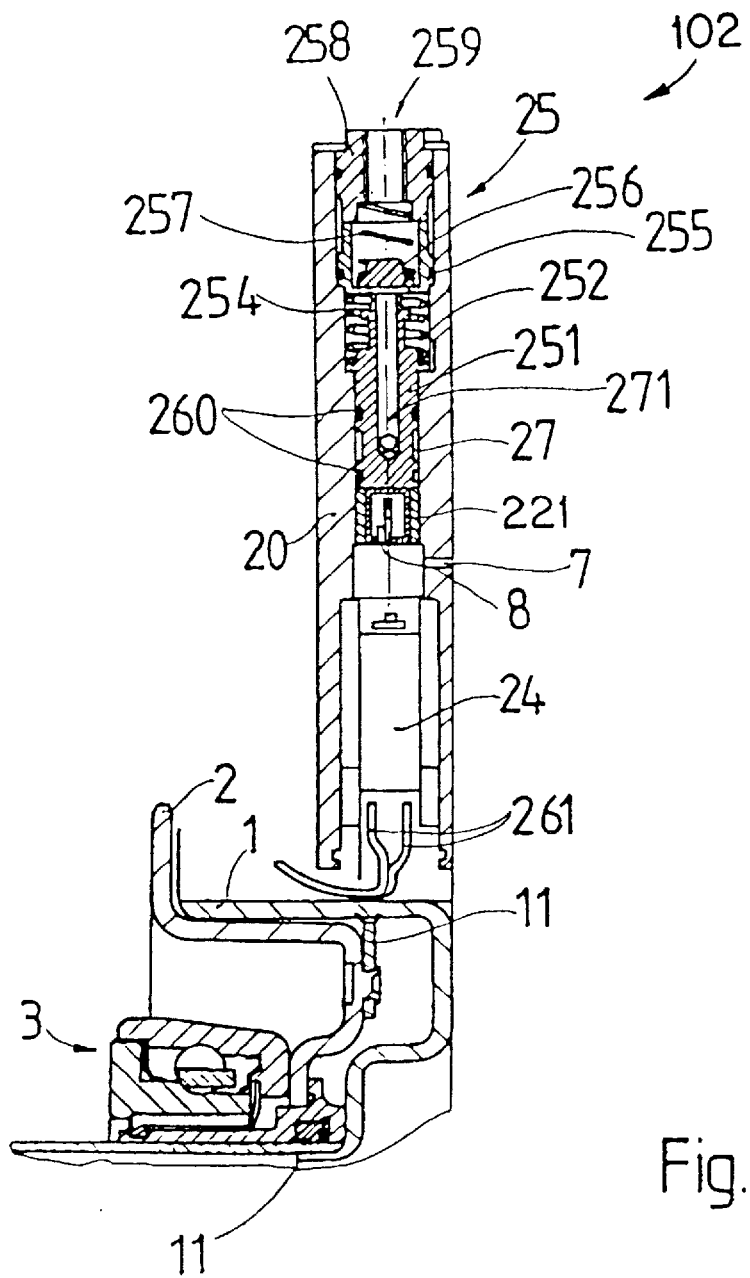
FIG. 8 is a longitudinal sectional view of an actuation device according to another embodiment of the present invention with direct mechanical control by an electric motor and with electrical actual-value sensing.
Figure 9:
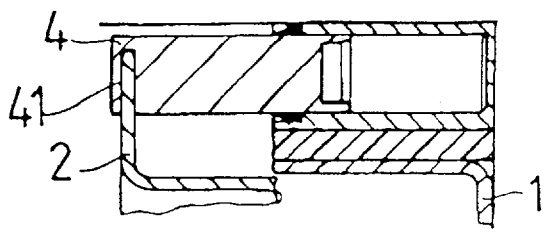
FIG. 9 is an enlarged sectional view through the device for electrical actual-value recording of FIG. 8.

FIGS. 8 and 9 show a further embodiment of an actuation device 102. It differs from the embodiment shown in FIGS. 6 and 7 in that the control valve device 25 is directly driven by the electromagnetic positioning device 24. This embodiment dispenses with the hydraulic transmission and hydraulic actual-value recording. In this case, the electric or electromagnetic actual-value recording by known methods may be employed. The use of a contactless electromagnetic actual-value signal generator is preferred, such as shown in FIG. 9. This can be arranged with angular offset relative to the electromagnetic positioning device 24, thus economizing in space.

Figure 10:
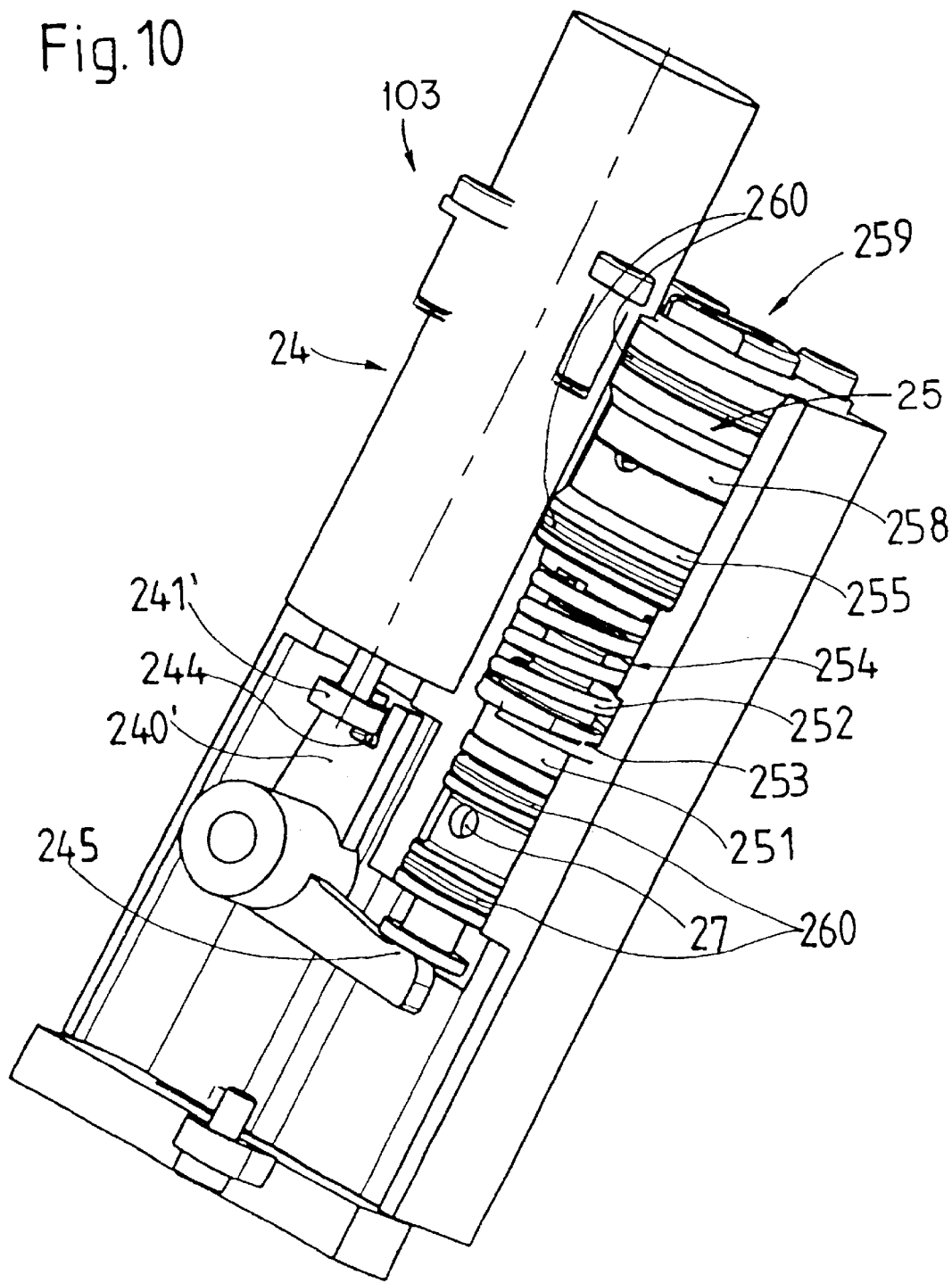
FIG. 10 is a partial sectional view of a subassembly including a rotating electric motor and a control valve according to yet another embodiment of the present invention including an eccentric cam with rocker arm.
Figure 11:
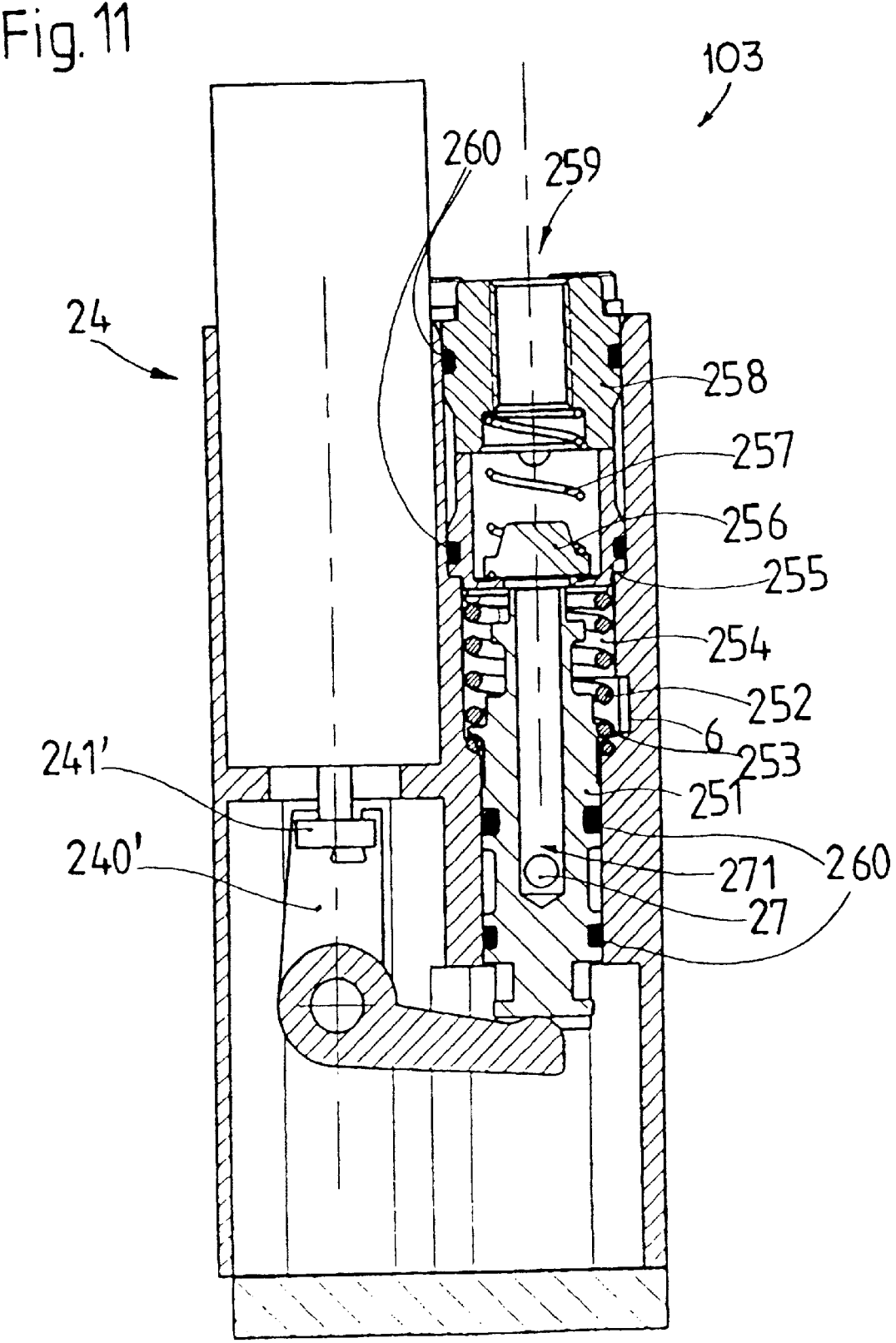
FIG. 11 is a longitudinal sectional view through the subassembly of FIG. 10.

FIGS. 10 and 11 show yet a further embodiment of an actuation device 103. In this embodiment, the control valve device 25 is likewise mechanically connected in that a conversion of the force generated by the electromagnetic positioning device 24 occurs via an eccentric cam and a rocker arm. This embodiment allows a construction that is almost as compact as the hydraulic conversion embodiment disclosed in FIGS. 6 and 7. The electromagnetic positioning device 24 of FIGS. 10 and 11 comprises a rotating electric motor on whose output shaft an eccentric cam 241' is fastened such that its radial extent engages a recess 244 of a rocker arm 240'. The rocker arm 240' is pivotally mounted about a pivot axis that is perpendicular to the center line of the motor. The rocker arm 240' comprises an actuation arm 245 that abuts the valve plunger 251 such that pivoting the rocker arm 240' produces an axial motion of the valve plunger 251. The pivoting of the rocker arm 240' is generated by rotation of the motor and the eccentric cam 241' thereby enabling the selective position control of the control valve 25. As in the case of the embodiment shown in FIGS. 8 and 9, the control may again preferably take place by electric or electromagnetic actual-value recording.

In some cases, it may be more favorable—for maintenance purposes—not to arrange the structural unit including the electromagnetic positioning device 24 and the control valve 25 so that it points upward, as shown in FIGS. 6, 7, 8 and 9, but to arrange them oppositely so that they point downward. The configuration shown in FIGS. 8 and 9 may be arranged so that it points downward without any further alteration. However, the snifter hole 202 has always to be arranged under the balance container 203 in the embodiment shown in FIGS. 6 and 7 because, otherwise, the hydraulic space 201 would empty into the balance container 203 via the snifter hole 202. For the same reason, the liquid level in the balance container 203 must always be above the hydraulic space 201. In this connection, the balance container 203 may be arranged near the electromagnetic positioning device 24 at the level of the displacer 21.

Individual features of the embodiment examples can, of course, be exchanged relative to one another without departing from the concept of the invention.

The invention is not limited by the embodiments described above which are presented as examples only but can be modified in various ways within the scope of protection defined by the appended patent claims.

We claim:

1. An actuation device for a friction clutch having a stationary clutch housing arranged in the drive train of a motor vehicle, comprising:
    a device housing including a hydraulic pressure space;
    an engagement/disengagement arrangement including a pressure fluid cylinder mounted in said device housing and a pressure fluid piston axially displaceably arranged within said pressure fluid cylinder;
    a control valve mounted in said device housing operatively connected to said engagement/disengagement arrangement such that said engagement/disengagement arrangement is selectively connectable to a pressure fluid source via said control valve, wherein said control valve comprises a valve plunger having a first end and a second end, a helical spring arranged between said first end of said valve plunger and said device housing for urging said second end of said valve plunger toward said hydraulic pressure space, a valve head which faces said first end of said valve plunger and is movable by said valve plunger from a rest position to an actuated position, and a valve seat fixed with respect to said housing, said valve head seated on said valve seat when said valve head is in said rest position; and
    an electromagnetic positioning device operatively connected to said control valve for actuating said control valve in response to a first control parameter representing a required parameter and a second control parameter representing an actual axial position of said pressure fluid piston.

2. The actuation device of claim 1, wherein said engagement/disengagement arrangement, said control valve, and said electromagnetic device are at least partially fastened within said device housing, wherein said device housing comprises at least a part of the stationary clutch housing.

3. The actuation device of claim 2, wherein, said pressure fluid piston is connectable to an engagement/disengagement bearing of the friction clutch.

4. The actuation device of claim 3, wherein said engagement/disengagement arrangement and the engagement/disengagement bearing arrangement are arrangeable concentrically with and on the same center line as the friction clutch.

5. The actuation device of claim 1, wherein said electromagnetic positioning device comprises an electric motor.

6. The actuation device of claim 5, wherein said electromagnetic positioning device comprises a linear step motor.

7. The actuation device of claim 1, wherein said electromagnetic positioning device actuates said control valve via a fluid in said hydraulic pressure space.

8. The actuation device of claim 7, wherein said electromagnetic positioning device is mounted to said device housing and comprises a displacer which protrudes via a seal element into said hydraulic pressure space, thereby being operatively connected to said control valve.

9. The actuation device of claim 7, further comprising a torque support for torsionally connecting said electromagnetic positioning device to said device housing, wherein said electromagnetic positioning device is operatively connected to a rotatable spindle and a displacer fastened to said spindle via a spindle acceptance device protrudes via a seal element fixed to said housing into said hydraulic pressure space so that said displacer is operatively connected to said control valve via a fluid in said hydraulic pressure space, said displacer operatively mounted in an axial guide for moving into and out of said hydraulic pressure space in response to rotation of said spindle by said electromagnetic positioning device.

10. The actuation device of claim 7, further comprising a displacement sensing device operatively connected to said pressure fluid piston for moving with said pressure fluid piston, said displacement sensing device protruding into said hydraulic pressure space such that a volume of said hydraulic pressure space is altered by said displacement sensing device as a function of the position of said pressure fluid piston.

11. The actuation device of claim 10, wherein said displacement sensing device further comprises first and second seal devices, wherein said first seal device is fastened to said device housing and said second seal device is fastened to said displacement sensing device.

12. The actuation device of claim 1, further comprising a signal processing device including an amplification device for controlling said control valve, wherein said signal processing device compares said first control parameter and said second control parameter.

13. The actuation device of claim 12, further comprising an electrical displacement sensing device operatively connected to said pressure fluid piston for determining the actual value of the axial position of the pressure fluid piston and outputting a signal representing said second control parameter.

14. The actuation device of claim 1, wherein said electromagnetic positioning device and said control valve are insertable onto said engagement/disengagement arrangement.

15. The actuation device of claim 1, wherein wherein said first control parameter is controlled via a position of a clutch pedal and a pedal displacement/pressure fluid piston displacement transmission characteristic exhibits a greater increase in the pressure fluid piston displacement in the vicinity of the initial and final positions of the pressure fluid piston than it does in a central region of the pressure fluid piston motion.

16. An actuation device for a friction clutch having a stationary clutch housing arranged in the drive train of a motor vehicle, comprising:

a device housing;

an engagement/disengagement arrangement including a pressure fluid cylinder mounted in said device housing and a pressure fluid piston axially displaceably arranged within said pressure fluid cylinder;

a control valve mounted in said device housing operatively connected to said engagement/disengagement arrangement such that said engagement/disengagement arrangement is selectively connectable to a pressure fluid source via said control valve; and an electromagnetic positioning device comprising an electric motor operatively connected to said control valve for actuating said control valve in response to a first control parameter representing a required parameter and a second control parameter representing an actual axial position of said pressure fluid piston, wherein the electric motor comprises a rotatable output element and a gear stage having a gear stage acceptance device for axial positioning of said gear stage in response to a rotation of said rotatable output element.

17. The actuation device of claim 16, wherein said electromagnetic positioning device comprises a rotating step motor.

\* \* \* \* \*